July 6, 1965

M. E. BASH 3,192,770

MULTI-POINT MEASURING APPARATUS

Filed April 8, 1960

INVENTOR
MICHAEL E. BASH
BY C. A. Weigel
ATTORNEY

INVENTOR
MICHAEL E. BASH
BY C. A. Weigel
ATTORNEY

INVENTOR
MICHAEL E. BASH

United States Patent Office 3,192,770
Patented July 6, 1965

3,192,770
MULTI-POINT MEASURING APPARATUS
Michael E. Bash, 32 Flannery Ave., Poughkeepsie, N.Y.
Filed Apr. 8, 1960, Ser. No. 21,021
2 Claims. (Cl. 73—341)

This invention relates to a multi-point measuring apparatus and more particularly to an instrument for measuring and/or recording at a plurality of stations by a corresponding plurality of thermocouples. In a preferred embodiment of the invention, the instrument may be converted to measure, for example, the temperature at different numbers of stations by the use of different pluggable connectors. Further, the instrument may be converted to accept different types of thermocouples by making relatively small and simple changes without the necessity for virtually rewiring the entire instrument.

Measuring instruments, of the type used with this invention, often employ the null balance principle of measurement in which a direct current (D.-C.) error signal from a bridge or potentiometer circuit is fed into a vibrator type of converter. This converter changes the D.-C. error signal to an alternating current (A.-C.) error signal which is then fed through several stages of voltage and power amplification until sufficient power is obtained to drive a reversible motor in the direction necessary to rebalance the potentiometer, or bridge circuit. A typical instrument servo of this type is described, for example, in the Wills Patent 2,423,540 issued July 8, 1947.

In the prior art, these multi-station (or multi-point) instruments were generally capable of measuring the temperature, as may be represented by a thermocouple electromotive force (E.M.F.), at only a fixed number of points. Thus, a six-point instrument was able to monitor six locations only. If the owner of such an instrument desired to monitor twelve different points, he was forced to buy another. If later such owner needed to measure twenty-four different points, he was forced to acquire still another instrument. Such requirement imposed an unnecessary cost burden upon the users of such measuring instruments.

A further difficulty arose in prior multi-point instruments using thermocouples when one attempted to change the type of thermocouples used at the several points. To effect such change generally required a substantial rewiring of the instrument. The reason for this difficulty, of course, is that the electromotive force (E.M.F.) developed by the measuring thermocouple depends upon the temperature of both the measuring and reference junctions of the thermocouple. In many applications it is not practical to maintain the reference junction of each of the thermocouples at a constant temperature, much less at 0° centigrade (the temperature at which most thermocouple reference tables are based). Hence, thermocouple extension wires were often used to transfer the reference junctions of the thermocouples back to the instrument itself wherein correction was made.

This correction is made in some instruments by the use of a temperature-sensitive resistor placed in the bridge of the measuring circuit. The temperature-sensitive resistor was physically located at a point closely adjacent the several transferred reference junctions which themselves are closely spaced such that the reference junctions and the temperature-sensitive resistor are at substantially the same temperature. Thus as the resistance of this compensating resistor changes in ambient temperature, the point of zero-voltage differential between the measuring and reference junctions is shifted to maintain calibration of the instrument. Unfortunately, this extensive use of thermocouple extension wires limits the use of each instrument to thermocouples that match the particular extension wires. If another type thermocouple was to be used, the instrument had to be virtually rewired using thermocouple extension wires which matched the new thermocouples.

Accordingly, it is an object of this invention to obviate the disadvantages, as set forth herein before, of the prior art multi-point instruments.

Another object of this invention is to successively measure the temperature at each of a plurality of stations without the attendant disadvantages of the prior art.

In accordance with this invention, a novel terminal box for a multi-point type measuring instrument is used. The terminal box serves not only as an input terminal board to which the several thermocouples are connected but also as a thermocouple cold reference junction compensator. Because of the manner of cold reference junction compensation, it is possible to use two plug-and-socket assemblies in a novel manner to obtain an instrument that (1) is capable of being converted to monitor differing numbers of points simply by using a different plug-in unit, and (2) is readily capable of being converted to operate with different types of thermocouples by replacing only the input terminal board.

In the prior art, normally, the cold reference junction of each thermocouple was at the pair of input terminals on the input terminal board to which it was connected. In a preferred embodiment of this invention all input terminals are connected to the socket portion of a pluggable connector by thermocouple extension wires, thereby transferring the cold reference junction of each thermocouple to the area enclosed by the socket. Now, the several cold reference junctions, instead of being dispersed over the relatively large terminal board areas, are concentrated in the relatively small socket area. Because of this small area, the temperature over the whole socket area may be considered uniform. The conventional cold reference junction compensating resistor has therefore been placed essentially at the center of this socket area thereby to compensate quite accurately for any temperature changes that occur within the socket area, which is effectively the cold reference junction of all the thermocouples.

Thus establishing the cold reference junction, each of the connectors, or pins, of the first socket may now be connected to their corresponding connectors, or pins, in the socket portion of a second pluggable connector by means of copper wire (since the cold reference junction has already been established, it is not necessary to use thermocouple material beyond the first socket). This socket serves as a receptacle for the plug of the second pluggable connector. The selector switch terminals are connected to the respective pins of this plug by means of standard copper wire. Since most of the connections to the input terminal board are through these pluggable connectors, it is a relatively simple matter to change or to service the input terminal board to accommodate thermocouples requiring different types of thermocouple extension wires.

Further in accordance with this invention, the first socket may be used as a selector means for determining the number of points the multi-point instrument samples. By selectively connecting together the several pins of the plug portion of the first connector, the instrument may be converted to sample the desired number of points merely by inserting the proper plug.

Further advantages and features of this invention will become apparent upon consideration of the following description read in conjunction with the drawing wherein.

Figure 1:
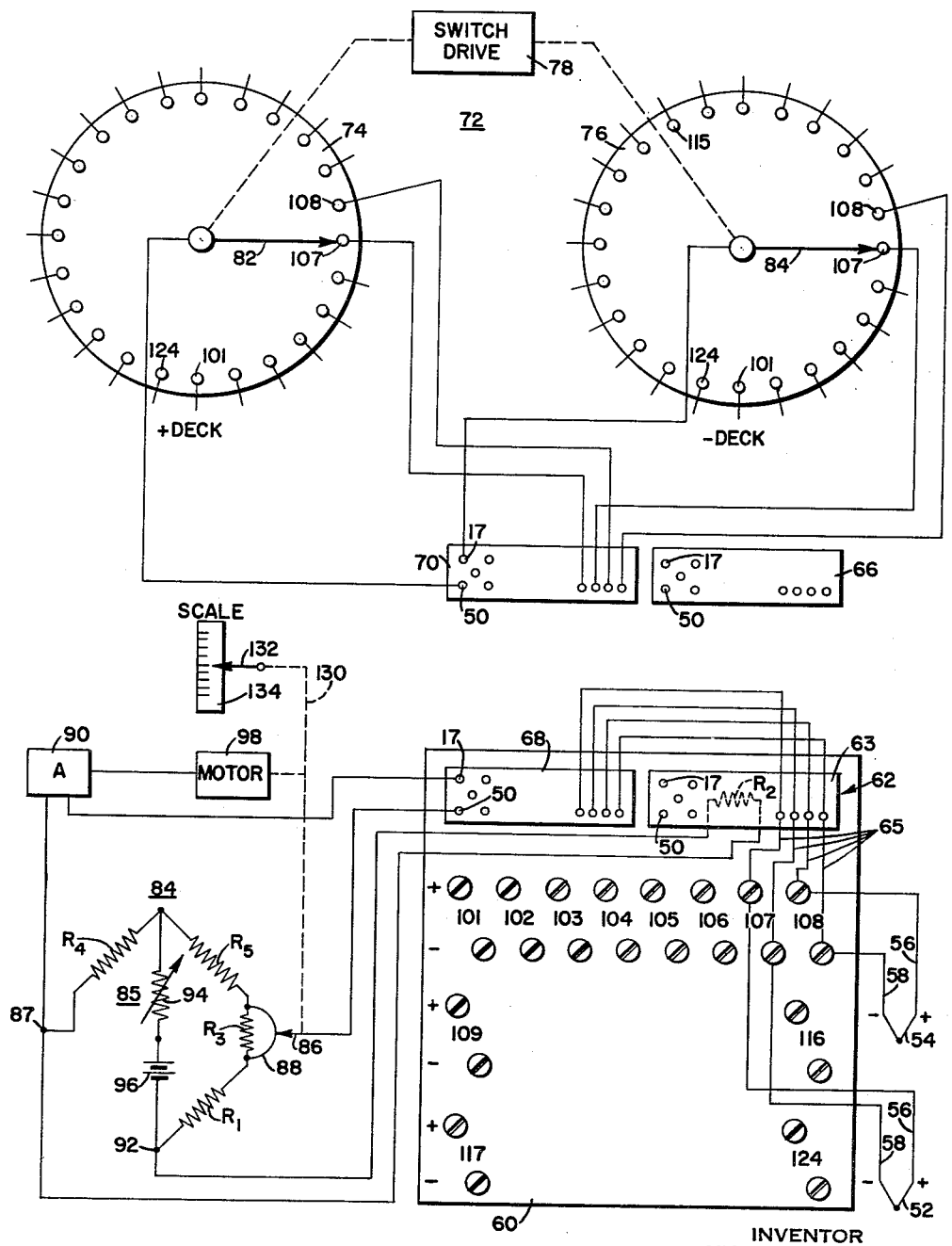
FIGURE 1 is a part block and part schematic diagram of a multi-point measuring instrument using this invention.

In FIGURE 1 there is illustrated a multi-point measuring instrument which is capable of measuring the temperature, as represented by a thermocouple E.M.F. at twenty-four different stations or points. Considering the drawing of FIGURE 1, in conjunction with FIGURE 2, the instrument is illustrated as having an input terminal board 60 on which are mounted twenty-four pairs of thermocouple input terminals 101 to 124, inclusive. In view of the relatively large number of points, the total number of thermocouples, terminals, connectors, and switching connections are illustrated completely for only two points in FIGURE 1. Thus, only two thermocouples, 52 and 54, are illustrated. For the purpose of a complete description, it is assumed that each of the thermocouples 52 and 54 is an iron-constantan thermocouple although it is recognized that other types of thermocouples may also be used. One lead 56, extending from the iron element (at which the E.M.F. is in the positive-going sense) of each of the thermocouples, 52 and 54, to one terminal of each of the pairs of terminals 107, 108, is made of iron. Each of the remaining leads 58, extending from the constantan element (at which the E.M.F. is in the negative-going sense) of each of the thermocouples 52, 54, to the remaining terminal of each of the terminal pairs 107, 108 is made of constantan. Thus connected, the cold reference junction of each of the thermocouples tends to exist at the several terminal pairs 101 to 124, inclusive, as in the prior art.

Figure 2:
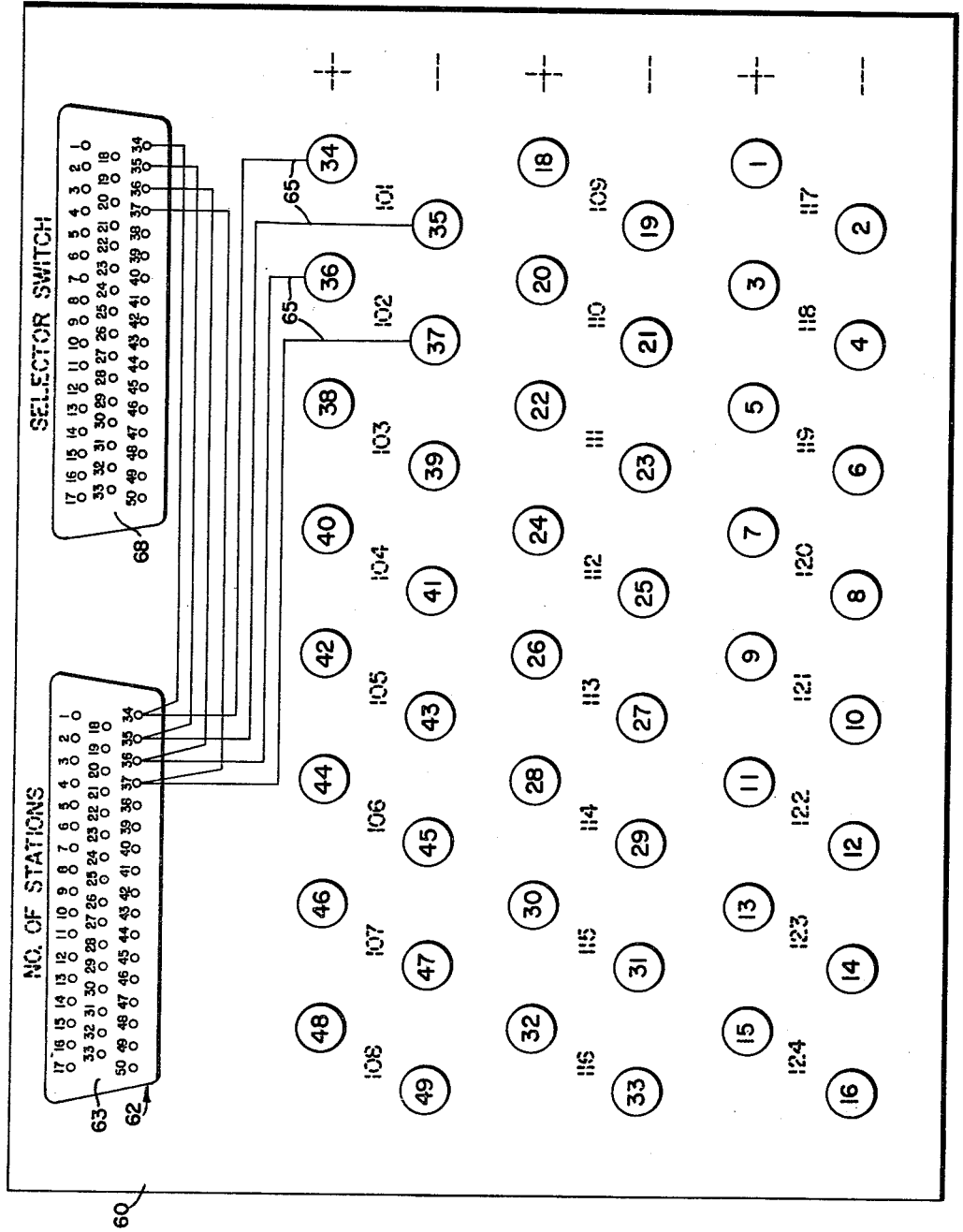
FIGURE 2 is an enlarged rear view of the terminal board in accordance with this invention.

In accordance with the invention the cold reference junction for each of the thermocouples (52 and 54 only are shown) is transferred by thermocouple extension wires 65 to what may be termed the socket portion of a number of stations plug 66 and socket 62, connector (62–66) having a relatively small socket area, 63. Extension wires 65 connect each individual input terminal, 1 to 50, inclusive, excepting 17 and 50 of each input terminal pairs 101 to 124 to corresponding connectors, or pins 1 to 50, inclusive, excepting 17 and 50, of the number-of-stations socket 62. The specific details of the several connections are illustrated in FIGURE 2 showing each of the input terminals 1 to 49, except 17, of the terminal pairs 101 to 124, inclusive. The material for the several extension wires is selected in accordance with known techniques. Usually, the extension wires are made of the same material as each of the primary leads from the thermocouple.

Figure 3:
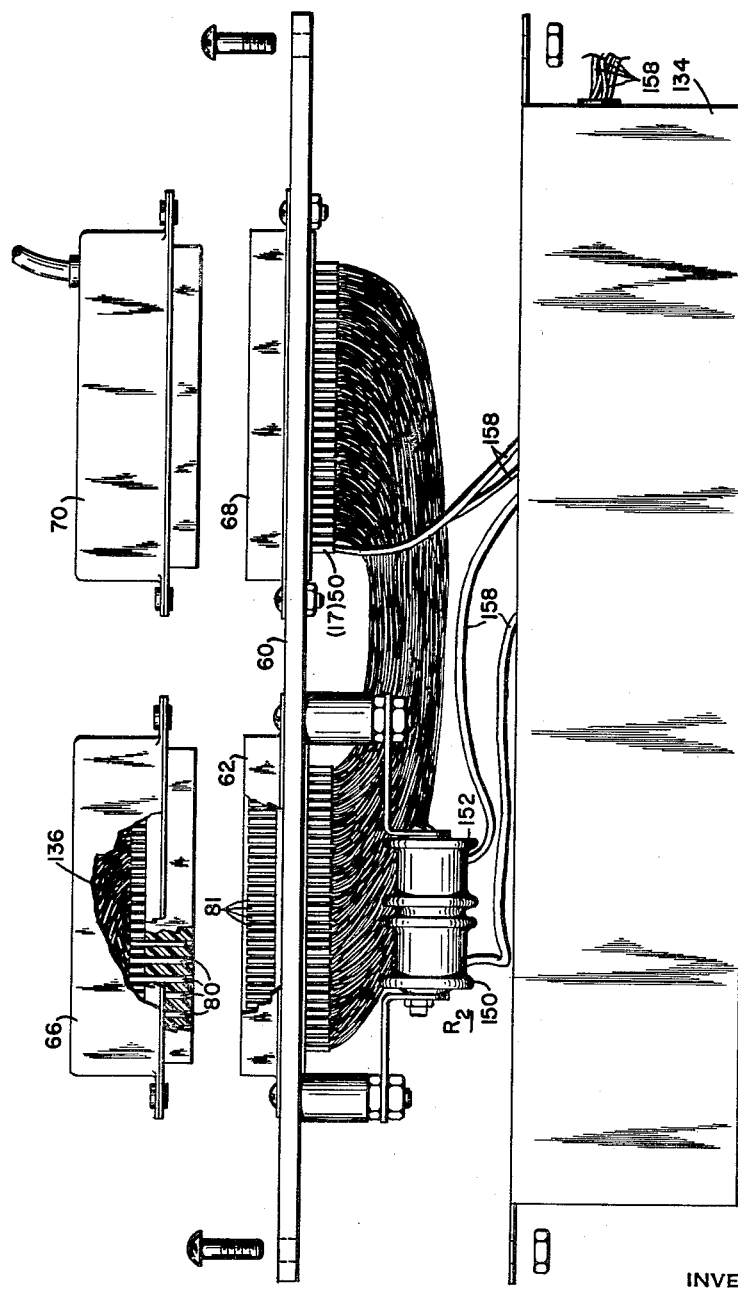
FIGURE 3 is an end view, partially exploded and cut away, of the terminal board FIGURE 2 and a housing therefor.

The number-of-stations plug 66, the details of which are illustrated in FIGURE 3, may include a plurality of connectors or connector receptacles 1 to 50, inclusive, corresponding in position to and adapted to be joined with, as by plugging, the respective connector pins 1 to 50, of the socket 62 to form the pluggable connector 62–66.

The numbers for all the receptacles 1 through 50 (FIGS. 1 and 3) are omitted for clarity. The several receptacles 1 to 50, inclusive, in the number-of-stations plug 66 are selectively connected together by copper wire 136 (FIG. 3) for example, to selectively parallel the several terminal pairs 101 to 124, inclusive. Each of the pins 1 through 49 (except 17) of the number-of-stations socket 62 is coupled to corresponding pins 1 through 49 (except 17), bearing the same number designation (FIG. 2), in a selector-switch-socket 68 that together with a selector-switch plug 70 form a selector switch connector 68–70. This latter connector 68–70 preferably is substantially identical to the number-of-stations pluggable connectors 62–66. Each of the connectors 62–66 and 68–70 may be a conventional connector such as Cannon type 401156. Obviously either of the elements 62, 66, or of 68, 70 may be the plug and the other the socket.

The selector switch plug 70, the details of which are illustrated in FIG. 3, includes a plurality of connectors or connector receptacles 1 through 50, corresponding in position to and adapted to be joined or mated with, as by plugging, the respective connector terminals 1 through 50 of the selector-switch-socket 68. Each of the connector receptacles 1 through 49, except 17, of the selector-switch-plug 70 is connected by copper wire, for example, to correspondingly numbered ones of the twenty-four selector switch terminals 101 to 124, inclusive (corresponding to the pairs of terminals 101 to 124, inclusive, on the terminal board 60). The selector switch 72 includes a positive (+) deck 74 and a negative (−) deck 76 each having twenty-four terminals 101 through 124. Those terminals on the positive deck 74 are thus seen to be connected to the positive input terminals (denoted +) of the terminal pairs 101 to 124, inclusive. Similarly, the switch terminals 101 to 124 on the negative deck 76 are seen to be connected to the corresponding negative terminals (denoted −) of the terminal pairs 101 to 124, inclusive, on the terminal board 60.

The positive and negative decks 74 and 76 include contact arms 82 and 84, respectively, which are adapted to be synchronously rotated, by a switch drive 78 to contact in succession each of the selector switch terminals 101 to 124, inclusive. Each of the contact arms 82 and 84 is connected to respective connector receptacles 17 and 50 of the selector-switch-plug 70 and thus (when the selector-switch connector 68–70 is joined) to corresponding pins 17 and 50 in the selector-switch-socket 68.

The thermocouple E.M.F. from the selected thermocouple, 52 or 54, appears at the pins 17 and 50 of the selector-switch-socket 68, which is connected to a measuring circuit 84. The measuring circuit 84 may be a conventional circuit in which the selected thermocouple positive cold junction is connected to the wiper contact 86 of a conventional slide wire 88. The wiper contact 86 of the slide wire 88 is paralleled by a resistor $R_3$ and forms one junction of a bridge circuit 85. The bridge circuit 85 includes four resistor arms, $R_4$, $R_5$ (and that portion of the parallel combination of the paralleling resistor $R_3$ and slide wire 88 as determined by the position of the wiper contact 86), $R_1$, and $R_2$. The resistor $R_2$ is placed, as illustrated, in FIGURE 3, closely adjacent the connectors, or pins, 1 through 50, inclusive, in the multiple-connector-junction box 62, which form the cold reference junctions for each of the several thermocouples. The temperature-sensitive-resistor $R_2$, as illustrated in FIG. 3, includes two serially connected wire wound resistors 150 and 152, one (150) being constructed of manganin wire, the remaining one (152) being constructed of copper wire that has a positive temperature-resistance coefficient.

The purpose of the copper wire resistor is to compensate for the change in E.M.F. produced by the selected thermocouple as a result of changes in its cold junction ambient temperature. As is known, this E.M.F. varies depending upon the particular thermocouple selected. Accordingly, the number of turns of copper wire and its size are selected to have a temperature-resistance characteristic to match the temperature E.M.F. characteristic of the thermocouple employed. The junction 87 of the bridge 85 existing between the fixed resistor $R_4$ and the temperature variable resistor $R_2$ is connected to one input of a conventional potentiometer amplifier 90. The remaining opposite junctions of the bridge have a serially connected variable resistor 94 and battery 96 connected there-between. The remaining input to the amplifier 90 is derived from the connector 17 in the junction box 68 which in turn is connected to the selected thermocouple negative cold reference junction.

In typical operation, the bridge circuit is normally balanced such that the potential over a known portion of the slide wire 88 is balanced against the thermocouple E.M.F. to be measured. If the temperature to be measured changes thus changing the E.M.F. generated by the selected thermocouple 52 or 54, the unbalance voltage, or error signal, is fed to the amplifier 90. In a typical amplifier such as described in the said Wills patent, this unbalanced voltage is converted by means of a chopper (not shown) to an alternating current (A.C.) potential. This small A.C. potential, through several stages of voltage and power amplification, provides sufficient energy to operate a two-phase reversible type balancing motor 98. The motor 98, through a linkage 130 (illustrated by the dotted line) may drive a pointer 132 to register on a scale 134 calibrated to read temperature directly. The linkage 130 may also drive the contact 86 of the slide wire 88 in such direction as to restore the balanced condition of the measuring circuit.

In accordance with this invention the cold reference junction of each of the several thermocouples is transferred to the relatively small area 63 enclosed by the (socket 62) by the use of the thermocouple extension wires 65. With the twenty-four different cold reference junctions concentrated in a relatively small area instead of being dispersed over the relatively large area of the terminal board 60, the temperature over the whole socket 62 area 63 can be considered as relatively uniform. As is apparent from FIG. 3, the reference junction compensation coil 152 of the resistor $R_2$ has been placed approximately at the center of the socket 62 area 63 thus compensating relatively accurately for any temperature changes. The uniformity of the temperature in the junction box area 63 is improved by the use of the rectangular enclosure 134 (FIG. 3) which encloses the backside of the terminal board 60.

By thus transferring the thermocouples' cold reference junctions to the number of stated connectors 1 through 49, except 17, it is possible to construct a multi-point instrument in accordance with the invention having (1) the ability to change the number of points it samples, and (2) the ability to change the type of thermocouple without re-wiring the instrument. Thus, by selectively paralleling the connector receptacles 1 through 49, excepting 17, in the number-of-stations plug 66 and inserting the desired plug into the number-of-stations socket 62, the multi-point recording instrument can be converted to a 2, 3, 4, 6, 8, 12, 18, 20, or 24 point recorder merely by the use of differently paralleled number-of-stations plug 66. As will be noted in FIG. 3, the number-of-stations plug 66 may have receptacles 80 corresponding to the connector receptacles 1 through 50, placed to receive the pins 81 corresponding to the pins 1 through 50 of the number-of-stations socket 62. Each of the connector receptacles 1 through 50 is selectively paralleled by copper wire connections 136. Using the number coding illustrated in FIG. 2, and dashes to denote the connector-receptacles 1 through 49 that are connected together, the different number-of-stations plugs 66 that may be constructed are set forth in the several charts below:

*2 stations*

34–38–42–46–18–22–26–30–1–5–9–13
35–39–43–47–19–23–27–31–2–6–10–14
36–40–44–48–20–24–28–32–3–7–11–15
37–41–45–49–21–25–29–33–4–8–12–16

*3 stations*

34–40–46–20–26–32–5–11
35–41–47–21–27–33–6–12
36–42–48–22–28–1–7–13
37–43–49–23–29–2–8–14
38–44–18–24–30–3–9–15
39–45–19–25–31–4–10–16

*4 stations*

34–42–18–26–1–9
35–43–19–27–2–10
36–44–20–28–3–11
37–45–21–29–4–12
38–46–22–30–5–13
39–47–23–31–6–14
40–48–24–32–7–15
41–49–25–33–8–16

*6 stations*

30–9–18–38
31–10–19–39
32–11–20–40
33–12–21–41
1–22–42–13
2–23–43–14
3–24–44–15
4–25–45–16
34–5–26–46
35–6–27–47
36–7–28–48
37–8–29–49

*8 stations*

1–18–34
2–19–35
3–20–36
4–21–37
5–22–38
6–23–39
7–24–40
8–25–41
9–26–42
10–27–43
11–28–44
12–29–45
13–30–46
14–31–47
15–32–48
16–33–49

*10 stations*

1–42–22–13
2–43–23–14
3–44–24–15
4–45–25–16
5–46
6–47
7–48
8–49
9–18
10–19
11–20
12–21
26–34
27–35
28–36
29–37
30–38
31–39
32–40
33–41

12 stations

1–42
2–43
3–44
4–45
5–46
6–47
7–48
8–49
9–18
10–19
11–20
12–21
13–22
14–23
15–24
16–25
26–34
27–35
28–36
29–37
30–38
31–39
32–40
33–41

16 stations

42–1
43–2
44–3
45–4
46–5
47–6
48–7
49–8
18–9
19–10
20–11
21–12
22–13
23–14
24–15
25–16

18 stations

46–5
47–6
48–7
49–8
18–9
19–10
20–11
21–12
22–13
23–14
24–15
25–16

20 stations

18–9
19–10
20–11
21–12
22–13
23–14
24–15
25–16

24 stations

No wiring

For example, it may be noted that the selector switch, as illustrated, has twenty-four positions per cycle which makes it suitable for a twenty-four point recorder. By paralleling the first twelve positions 101 through 113 of each of the decks 74 and 76 of the selector switch 72 with the second twelve positions 113 to 124, inclusive, and by connecting together the corresponding connector receptacles 80 in the number-of-stations plug 66 and inserting this plug in the number-of-stations socket 62, it becomes a twelve-position switch which is essential to a twelve-point instrument.

The ability to change the type of thermocouples used without rewiring the instrument also results from the use of this invention. If, for example, it is desired to use a particular type of thermocouple, one simply selects a terminal board 60 having matching thermocouple extension wires 65. The selected terminal board 60 is incorporated in the circuitry of the instrument simply by inserting the plugs 66 and 70 into their respective sockets 62 and 63 and connecting the four leads 158, from the resistor $R_2$ and the connectors 17 and 58 in the selector-switch socket 68 to the bridge circuit 85. The leads 158 may each be terminated in plugs (not shown) to facilitate their connection.

There has been described a novel multi-point instrument that (1) is capable of being converted to monitor differing numbers of points by the simple expedient of replacing a pluggable connector, and (2) is capable of being converted to operate with different types of thermocouples by the relatively simple expedient or replacing only the input terminal board without the necessity for extensively rewiring the entire instrument. This results in a simpler, more adaptable, and cheaper instrument.

Since many changes could be made in the specific combinations of specifications disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. In a multi-point measuring instrument having a measuring circuit for selectively measuring the electromotive force produced by each of a plurality of thermocouples, a separate terminal box comprising a terminal board having a plurality of pairs of input terminals adapted to have a corresponding plurality of thermocouples connected thereto, the cold reference junctions of each of said thermocouples normally being at each of said pairs of input terminals, a first multiple socket assembly having a relatively small socket area mounted on said terminal board, means including thermocouple extension wires for transferring said cold reference junctions from said input terminals to respective sockets of said socket assembly thereby to concentrate said transferred cold reference junctions to the relatively small socket area, a second multiple socket assembly mounted on said terminal board, means for connecting each of said transferred cold reference junctions to said second assembly whereby said terminal board is easily serviced and replaced, means for sequentially connecting each of said pairs of input terminals to said measuring circuit through said respective sockets and said second socket assembly, said measuring circuit including a temperature-sensitive means adapted to compensate for the effects of variations of the temperature of said transferred cold reference junctions, said last named means being mounted adjacent said first socket assembly at substantially the center of said socket area whereby the temperature of said temperature-sensitive means and said transferred cold reference junctions is substantially the same thereby to compensate accurately for the effects of any temperature changes of said transferred cold reference junctions, and a multiple plug assembly means adapted to mate with said first socket assembly for selectively connecting certain of said input terminals together whereby said sequential connecting means effects additional measurements at the plug-assembly-connected input terminals.

2. In a potentiometer circuit, a multiple-connector assembly having a plurality of connectors, a plurality of thermocouples each having a pair of reference junctions connected by thermocouple extension wires to different pairs of said connectors, a balanced bridge circuit having four arms and a source of electromotive force connected to one pair of opposite junctions between said arms, and a pair of output terminals connected to the remaining pair of opposite junctions to provide an electromotive force in opposition to that produced by the thermocouples, one arm of said bridge including a resistor physically placed in close proximity to said multiple connector assembly, said resistor having a temperature-resistance coefficient similar to the temperature-voltage coefficient of said thermocouples, thereby to compensate for changes in thermocouple electromotive force as a function of temperature of said reference junctions, and selective switching means adapted to move through a cycle to sequentially connect said different pairs of said connectors to said pair of output terminals, said multiple-connector assembly including pluggable means adapted to connect selected ones of said connectors together, whereby in each cycle of said selective switching means said selective switching means effects additional measurements at the pluggable-means-connected input terminals.

References Cited by the Examiner
UNITED STATES PATENTS

| | | | |
|---|---|---|---|
| 558,750 | 4/96 | Wright | 317—99 |
| 1,344,462 | 6/20 | Thwing | 73—341 |
| 2,072,312 | 3/37 | Obermaier | 73—341 |
| 2,739,271 | 3/56 | Umrath et al. | 317—99 |
| 2,780,097 | 2/57 | McKinlay | 73—361 |
| 2,906,985 | 9/59 | Gauld | 317—118 |

ISAAC LISANN, *Primary Examiner.*